V. V. TORBENSEN.
AXLE.
APPLICATION FILED AUG. 4, 1920.
1,427,502. Patented Aug. 29, 1922.
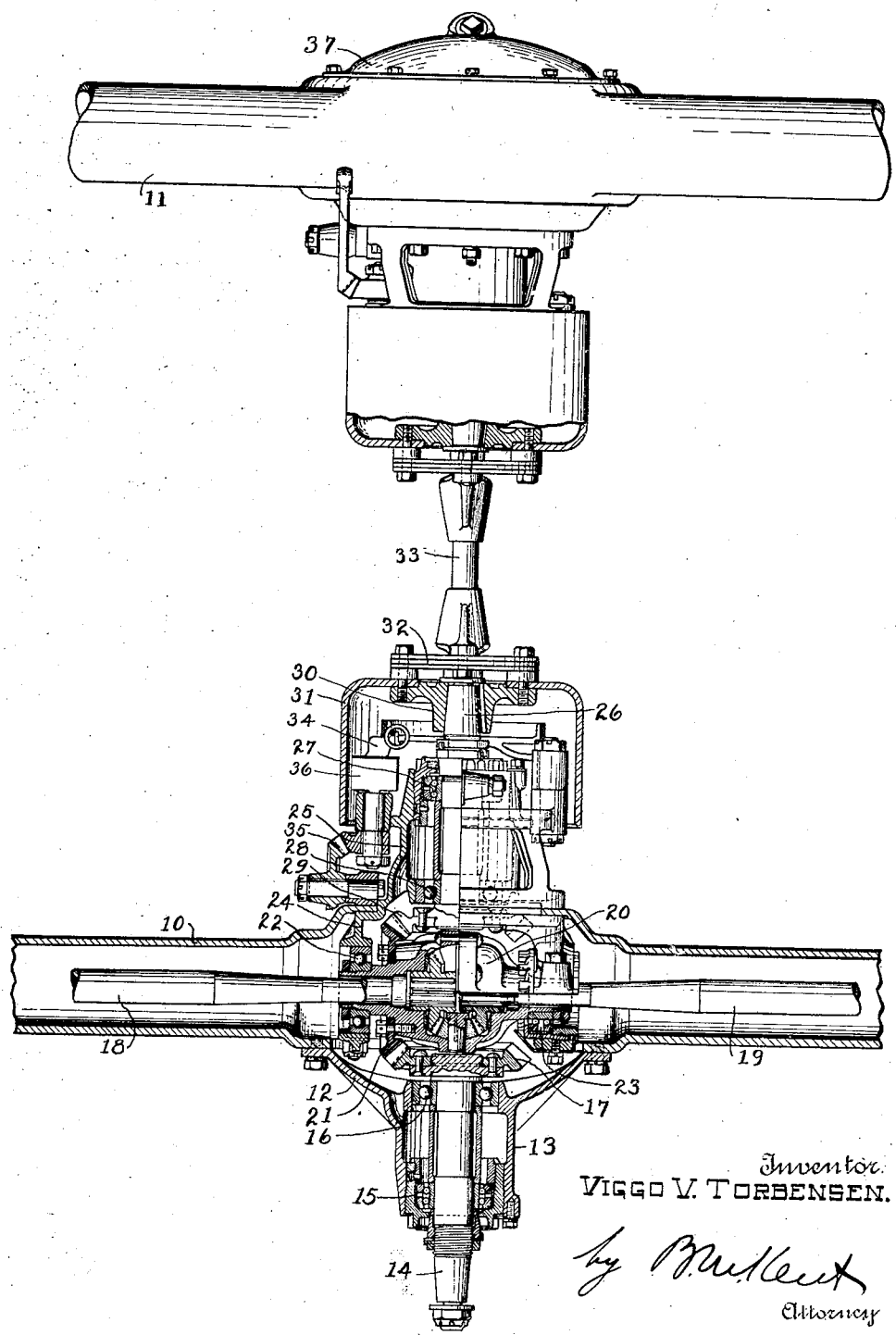
Inventor
VIGGO V. TORBENSEN.
Attorney

UNITED STATES PATENT OFFICE.

VIGGO V. TORBENSEN, OF CLEVELAND, OHIO, ASSIGNOR TO THE STANDARD PARTS COMPANY, OF CLEVELAND, OHIO, A CORPORATION OF OHIO.

AXLE.

1,427,502.  Specification of Letters Patent.  Patented Aug. 29, 1922.

Application filed August 4, 1920. Serial No. 401,114.

*To all whom it may concern:*

Be it known that I, VIGGO V. TORBENSEN, a citizen of the United States, and a resident of Cleveland, county of Cuyahoga, State of Ohio, have invented certain new and useful Improvements in Axles, of which the following is a specification.

This invention relates to motor vehicle axles and more particularly to the combination of two driving axles, such as is now used on six-wheel trucks.

It is one of the objects of the invention to provide a simple construction, embodying substantially duplicate units in one of the axles, to receive the power from the usual propeller shaft and transmit it to the other axle.

Other objects of the invention and the features of novelty will be apparent from the following description, taken in connection with the accompanying drawing, in which:—

A plan view of two combined axles, one of the axles being shown in horizontal section and both axles having their end portions, which receive the wheels, omitted.

Referring to the drawing, 10 and 11 indicate the housings of two axles and in the type of axles illustrated, these housings also constitute load-carrying members. The housing 10 carries on one side thereof a cover plate 12 which embodies a tubular extension 13 to receive a driving shaft 14. This shaft is mounted in bearings 15 and 16 and carries, at its inner end, the miter bevel gear 17. Wheel-driving shafts 18 and 19 are arranged in the housing 10 and are driven from the usual differential mechanism 20, on which there is secured a bevel gear 21 which meshes with the gear 17. The differential mechanism 20 is mounted in bearings 22 and 23 on the carrier 24, this carrier having an extension 25 for the shaft 26, the shaft being mounted in bearings 27 and 28. At its inner end, the shaft 26 carries a bevel gear 29 which meshes with the gear 21 and is driven thereby. The shaft 26 also carries, at its outer end, a flange 30 on which a brake drum 31 is supported, a universal joint 32, of any preferred construction, connecting the flange 30 with the shaft 33, which drives the shafts of the axle 11. An internal brake 34 cooperates with the brake drum 31 and is actuated by any suitable mechanism, such as sector gears 35 and the cam 36.

By providing miter gears at the points 17, 21 and 29, it is possible to have a symmetrically arranged design which is extremely simple, and the cover plate 12 for one side of the axle may carry the propeller shaft and gear to mesh with the gear 21, on an ordinary single axle, in place of the usual cover plate 37 seen on the axle 11.

Having thus described my invention, what I claim is:—

1. In axle construction, the combination of a housing having openings at the front and rear, a differential carrier arranged in one of said openings and having a shaft mounted therein, a gear on the inner end of said shaft, a differential mounted in said carrier and having a gear meshing with the first-mentioned gear, and a cover for the other of said openings having a shaft mounted therein, the latter shaft having a gear at its inner end meshing with said differential gear.

2. In axle construction, the combination of a hollow load-carrying member having openings at the front and rear, a gearing carrier arranged in one of said openings and having a shaft mounted therein at right angles to the axis of said member, a gear on the inner end of said shaft, a gear mounted in said carrier and meshing with the first-mentioned gear, a cover for the other of said openings, a shaft mounted in said cover, and a gear on the latter shaft meshing with the second-mentioned gear.

In testimony whereof I affix my signature.

VIGGO V. TORBENSEN.